(12) United States Patent
Razzano

(10) Patent No.: US 7,361,722 B2
(45) Date of Patent: Apr. 22, 2008

(54) METHODS OF MAKING HIGH FLUORINE CONTENT FLUORO-SILICONE COPOLYMERS

(75) Inventor: John S. Razzano, Cohoes, NY (US)

(73) Assignee: Momentive Performance Materials Inc., Wilton, CT (US)

( * ) Notice: Subject to any disclaimer, the term of this patent is extended or adjusted under 35 U.S.C. 154(b) by 408 days.

(21) Appl. No.: 11/272,987

(22) Filed: Nov. 14, 2005

(65) Prior Publication Data

US 2006/0293479 A1    Dec. 28, 2006

(51) Int. Cl.
*C08G 77/16* (2006.01)
*C08G 77/26* (2006.01)

(52) U.S. Cl. ............................. 528/34; 528/38; 528/36
(58) Field of Classification Search ................ 528/34, 528/38, 36
See application file for complete search history.

(56) References Cited

U.S. PATENT DOCUMENTS 5,028,679 A * 7/1991 Terae et al. .................... 528/12

* cited by examiner

*Primary Examiner*—Kuo-Liang Peng
(74) *Attorney, Agent, or Firm*—Kenneth S. Wheelock

(57) ABSTRACT

A method of producing silicone copolymers having fluorinated repeat units (D units) wherein the fluorine content of the copolymer is above about thirty-seven (37) weight percent.

15 Claims, No Drawings

METHODS OF MAKING HIGH FLUORINE CONTENT FLUORO-SILICONE COPOLYMERS

FIELD OF THE INVENTION

The field of the invention relates to fluoro-silicone compositions, methods of making and methods of using, more particularly the fluoro-silicone compositions of the present invention relate to fluoro-silicone copolymers.

BACKGROUND OF THE INVENTION

Most fluoro-silicones are polymers or co-polymers containing tri-fluoropropyl substitutents. A linear fluoro-silicone homopolymer where the D unit had the formula:

$$(CF_3CH_2CH_2)_2SiO_{2/2}$$

approaches thirty-seven weight percent fluorine. Fluoro-silicones possess desirable properties not otherwise obtainable in silicone compositions and many of these properties improve with increasing fluorine mole (or weight) percent in the polymer. Thus it is desirable to be able to prepare fluoro-silicones having fluorine contents in excess of thirty-seven weight percent.

SUMMARY OF THE INVENTION

The present invention provides for a method of making a fluorosilicone composition comprising M, D and D' units having the formula:

$$M_a D_b D'_c$$

with:

$$M=R^1R^2R^3SiO_{1/2},$$

where $R^1$ and $R^2$ are each independently selected from the group of C1 to C40 monovalent hydrocarbon radicals and $R^3$ is selected from the group consisting of C1 to C40 monovalent hydrocarbon radicals, C2 to C40 monovalent alkenyl hydrocarbon radicals, hydrogen, hydroxyl, C3 to C16 fluorine substituted monovalent hydrocarbon radicals and $R^{11}R^{12}N$ where $R^{11}$ is selected from the group C1 to C10 monovalent hydrocarbon radicals and $R^{12}$ is selected from the group C1 to C10 monovalent hydrocarbon radicals and hydrogen;

$$D=R^4R^5SiO_{2/2},$$

where $R^4$ is selected from the group consisting of C1 to C40 monovalent hydrocarbon radicals, C2 to C40 monovalent alkenyl hydrocarbon radicals and C3 to C7 fluorine substituted monovalent hydrocarbon radicals and $R^5$ is selected from the group of C3 to C7 fluorine substituted monovalent hydrocarbon radicals; and $$D'=R^6R^7SiO_{2/2},$$

where $R^6$ is selected from the group consisting of C1 to C40 monovalent hydrocarbon radicals and C6 to C16 fluorine substituted monovalent hydrocarbon radicals and $R^7$ is selected from the group of C8 to C16 fluorine substituted monovalent hydrocarbon radicals, where the subscripts a, b and c and the subscripts b and c are non-zero and positive, a is at least 2 and c is at least 2. The present invention further provides for silicone copolymers having fluorinated repeat units wherein the fluorine content of the copolymer is above about thirty-seven (37) weight percent.

DETAILED DESCRIPTION OF THE INVENTION

The method of making the simplest compositions of the present invention results in compositions having the formula:

$$M_a D_b D'_c$$

where $$M=R^1R^2R^3SiO_{1/2},$$

where $R^1$ and $R^2$ are each independently selected from the group of C1 to C40 monovalent hydrocarbon radicals and $R^3$ is selected from the group consisting of C1 to C40 monovalent hydrocarbon radicals, C2 to C40 monovalent alkenyl hydrocarbon radicals, hydrogen, hydroxyl, C3 to C16 fluorine substituted monovalent hydrocarbon radicals and $R^{11}R^{12}N$ where $R^{11}$ is selected from the group C1 to C10 monovalent hydrocarbon radicals and $R^{12}$ is selected from the group C1 to C10 monovalent hydrocarbon radicals and hydrogen;

$$D=R^4R^5SiO_{2/2},$$

where $R^4$ is selected from the group consisting of C1 to C40 monovalent hydrocarbon radicals, C2 to C40 monovalent alkenyl hydrocarbon radicals and C3 to C7 fluorine substituted monovalent hydrocarbon radicals and $R^5$ is selected from the group of C3 to C7 fluorine substituted monovalent hydrocarbon radicals; and $$D'=R^6R^7SiO_{2/2},$$

where $R^6$ is selected from the group consisting of C1 to C40 monovalent hydrocarbon radicals and C8 to C16 fluorine substituted monovalent hydrocarbon radicals and $R^7$ is selected from the group of C6 to C16 fluorine substituted monovalent hydrocarbon radicals, where the subscript a is two and the subscripts b and c are non-zero and positive.

More complex compositions of the present invention may have the following formula:

$$M_a D_b D'_c T_e Q_f$$

where M, D and D' are as previously defined and $T=R^8SiO_{3/2}$ where $R^8$ is selected from the group consisting of C1 to C40 monovalent hydrocarbon radicals and C3 to C16 fluorine substituted monovalent hydrocarbon radicals and $Q=SiO_{4/2}$. where the subscripts a, b and c are as previously defined and the subscripts e and f are non-zero and positive.

Higher order co-polymers or terpolymers embodying the method of the present invention may have the formula:

$$M_a M'_g D_b D'_c T_e Q_f$$

or $$M_a M'_g D_b D'_c D''_h T_e Q_f$$

or $$M_a M'_g D_b D'_c T_e T'_i Q_f$$

or $$M_a M'_g D_b D'_c D''_h T_e T'_i Q_f$$

and the like. Where the additional M, D and T groups have formulas identical to those already defined but with different choices of the substituent functionalities. It is readily apparent that additional M, D and T groups may be utilized to make higher order co-polymers, terpolymers, block co-polymers and the like containing at least one D group that contained a C8 to C16 fluorine substituted monovalent hydrocarbon radical.

It should be noted that the copolymers, terpolymers and higher order polymers embodying compositions of the present invention require the presence of at least two different D groups, D and D', both of which contain at least one R group that is a fluorine substituted monovalent hydrocarbon radical, $R^5$ for D and $R^7$ for D'. When it is desired to have materials that further polymerize or cure either by a free-radical cure or by an addition cure, substituents should be chosen to provide for alkenyl groups on the M or D units.

One method of preparing some of the compositions of the present invention utilizes perfluoro alpha olefins having the following formula:

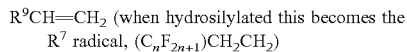
$R^9CH=CH_2$ (when hydrosilylated this becomes the $R^7$ radical, $(C_nF_{2n+1})CH_2CH_2$)

where $R^9$ is a monovalent C8 to C16 perfluoro-alkyl radical having the formula $C_nF_{2n+1}$, n is 4 or greater, preferably ranging from 4 to 18 more preferably from 4 to 14 and reacting the perfluoro alpha olefin under hydrosilylation conditions with a substituted hydrogen di-halo-silane preferably an hydrocarbyl hydrogen di-halo-silane having the formula:

$R^{10}HSiX_2$, where $R^{10}$ is selected from the group of consisting of C1 to C40 monovalent hydrocarbon radicals and C3 to C16 fluorinated monovalent hydrocarbon radicals and X is a halogen selected from the group consisting of F, Cl, Br and I. In one specific embodiment $R^{10}$ is methyl and X is chlorine. Generally the hydrosilylation of the perflouro alpha olefin and the alkyl hydrogen di-halo-silane will yield a compound having the formula:

$(R^9CH_2CH_2)R^{10}SiX_2$ which may be further reacted with either a primary or secondary organic amine, $R^{11}NH_2$ or $R^{11}R^{12}NH$, where $R^{11}$ is selected from the group C1 to C10 monovalent hydrocarbon radicals and $R^{12}$ is selected from the group C1 to C10 monovalent hydrocarbon radicals and hydrogen where $R^9$ and $R^{10}$ are as previously to yield a di-amino silane having either the formula:

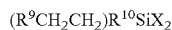
$(R^9CH_2CH_2)R^{10}Si(R^{11}NH)_2$ or $(R^9CH_2CH_2)R^{10}Si(R^{11}R^{12}N)_2$ depending on whether the primary or the secondary amine is used. In one specific embodiment the amine is a primary amine, iso-propyl amine, $(CH_3CHCH_3)NH_2$.

$(R^9CH_2CH_2)R^{10}Si(R^{11}NH)_2$ or $(R^9CH_2CH_2)R^{10}Si(R^{11}R^{12})_2$ is further reacted with a silanol terminated fluorine containing siloxane having the formula:

$M^RDwM^R$ where $M^R=R^1R^2R^3SiO_{1/2}$, with $R^1$ being hydroxyl, $R^2$ being methyl and $R^3$ being trifluoropropyl (i.e. $CF_3CH_2CH_2$) with the subscript w ranging from 1 to 50, preferably from 1 to 35, more preferably from 1 to 25 and most preferably from 1 to 15 and where $D=R^4R^5SiO_{2/2}$, with $R^4$ being methyl and $R^5$ being trifluoropropyl or another fluorinated substituent (i.e. $CF_3CH_2CH_2$) with

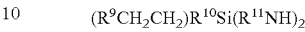
$(R^9CH_2CH_2)R^{10}Si(R^{11}NH)_2$ with $R^9$ being $C_8F_{17}$ and $R^{10}$ being $CH_3$ and $R^{11}$ being iso-propyl, i.e. $CH_3CHCH_3$ yields a copolymer of the formula:

$M(DD')_mM'$ where $M=R^1R^2R^3SiO_{1/2}$, with $R^1$ being hydroxyl, $R^2$ being methyl and $R^3$ being trifluoropropyl or another fluorinated substituent (i.e. $CF_3CH_2CH_2$);

$D=R^4R^5SiO_{2/2}$, with $R^4$ being methyl and $R^5$ being trifluoropropyl;

$D'=R^6R^7SiO_{2/2}$, with $R^6$ being $C_8F_{17}CH_2CH_2$ and $R^7$ being methyl; and $M'=R^1R^2R^3SiO_{1/2}$ is as previously defined but where the various R groups are necessarily chosen differently from the choices for the previous M group so that while sharing the same definition, the choices of R groups as between M and M' makes M' different from M, here in this instance $R^1$ may be $C_8F_{17}CH_2CH_2$, $R^{14}$, $R^2$ may be methyl, and $R^3$) may be $R^{11}NH$ with $R^{11}$ being iso-propyl, $CH_3CHCH_3$, and m (or c) is 2 or greater. Optionally methylvinyldiisopropylaminosilane may be reacted with the silanol terminated siloxane to provide reactive unsaturation as a substituent along the siloxane chain prior to polymerizing. Generally the extent of polymerization, as may be measured by the subscript m will contain at least two D' groups, specifically at least 100 D' groups, more specifically at least 500 D' groups, and most specifically at least 1,000 D' groups. Typically a degree of polymerization is preferred that produces a fluoro-silicone polymer having a weight percent fluorine content in excess of 37.5 wt. %, more specifically in excess of 45.0 wt. % and most specifically in excess of 50.0 wt. %.

When prepared in this fashion the co-polymer, terpolymers or higher order fluoro-silicone polymer will usually have a hydroxyl termination ($R^1$) and/or an amino termination ($R^3$). Such terminal groups are reactive and may be further reacted by techniques known in the art, e.g. using $(CH_3)_2(R^{13}CH=CH)Si(NH(CH_3CHCH_3))$, $R^{13}$ being a hydrogen or C1 to C40 monovalent hydrocarbon radical, or $(CH_3)_2(R^{13}CH=CH)Si(NH(CH_3CHCH_3))$, to functionalize the end of the polymer chain, creating alkenyl endcapped polymers or hydride endcapped polymers. Specifically such alkenyl and hydride endcapped materials would then be capable of further reaction via hydrosilylation to create cross-linked networks. For example hydroxyl termination may be converted to other terminations, such as vinyl termination by reaction with such materials as dimethylvinylisopropylaminosilane or tetramethyldivinyldisilazane, and to hydride termination using dimethylisopropylaminosilane or tetramethylsilazane or to trimethyltermination using trimethylisopropylaminosilane or hexamethyldisilazane. Amino terminations may be converted to other terminations by first hydrolyzing the amino groups to hydroxyl groups and converting the hydroxyl groups as previously described.

Another preparative method that may be utilized involves the reaction of a fluorine containing silanol terminated siloxane having the formula (as previously specifically defined):

$$M^R D_w M^R$$

with $$(R^9CH_2CH_2)R^{10}SiX_2$$

to yield a polymer having the formula $$M(DD')_n M$$

where $M=R^1R^2R^3SiO_{1/2}$, with $R^1$ being hydroxyl, $R^2$ being methyl and $R^3$ being trifluoropropyl (i.e. $CF_3CH_2CH_2$) as previously defined and where $$D=R^4R^5SiO_{2/2},$$

with $R^4$ being methyl and $R^5$ being trifluoropropyl (i.e. $CF_3CH_2CH_2$) as previously defined with
$D'=R^6R^7SiO_{2/2}$, with $R^6$ being $C_8F_{17}CH_2CH_2$ and $R^7$ being methyl.

EXPERIMENTAL

Preparation of F17 Dichlorosilane:

205 grams of methyldichlorosilane (1.78 moles) were added to a 1 l. flask with a mechanical agitator, an addition funnel and a dry ice condenser with a N2 purge at the top of the condenser. To this was added 3 drops of a Platinum-tetramethyldivinyldisiloxane complex with a platinum content of 10%. The silane was heated to reflux: 42° C. 66 grams of perfluorooctylethylene was added to the refluxing silane using the addition funnel and allowed to react until the reflux rate increase. The reactor temperature rose to 43° C. and the reaction continued until the batch temperature returned to 42° C. Increments of 66 g of the perfluroroctylethylene was added and allowed to react completely before the next addition. With each addition the batch temperature increased. A total of 669 gram of the perfluorooctylethylene was added (1.5 moles), and reflux was continued for one hour after the last addition. The flask was equipped with a distillation head with no fractionation. The excess methylchlorosilane was distilled from the flask. The product was then distilled at an overhead temperature of 223° C. 804 grams of product was collected, 94.6% yield.

Preparation of F17 Diamine:

A 5 liter flask with an agitator and an addition funnel, and which was swept with N2, was placed in an ice bath. 3 liters of hexane was added along with 320 grams of isopropylamine. 1400 g of 1,1,1,2,2,3,3,4,4,5,5,6,6,7,7,8,8-heptadecafluorodecylmethyldichlorosilane were added to the addition funnel in increments and added to the agitated hexane/isopropylamine solution at a rate which kept the content of the flask at below 40° C. Voluminous amount of salt as ispropylamine hydrochloride were formed and agitation was increased to keep the contents mixed. After the addition was complete, the flask was cooled to 10° C. under agitation. The contents of the flask were poured into a filter funnel with aspirator vacuum. The solids were pulled tight in the funnel with a thin sheet of polyethylene, and the cake was washed twice with 300 ml aliquots of hexane and pulled tight with the polyethylene sheet after each wash. The 1 liter of the filtrate was put in a 2 liter flask and hexane was distilled at atmospheric pressure. As hexane was removed, additional filtrate was added. After most of the hexane was removed, aspirator vacuum was applied with the distillate condensed with a dry ice condensor until no more hexane condensed. 1,425 grams of 1,1,1,2,2,3,3,4,4,5,5,6,6,7,7,8,8-heptadecafluoro-decylmethyl-diisopropylaminesilane (HFDAS) was isolated, 94% yield. This was distilled under vacuum to yield 1,350 gram of HFDAS at greater than 99% purity.

Preparation of (Fluorinated) Copolymer:

691 g HFDAS was placed in a 500 ml resin flask which was in an oil bath at 130° C. 150 g of a trifluoropropylmethylsiloxanediol, with an average siloxane length of 3.4, and containing 11% 1,3,5-tris(3,3,3-trifluoropropyl)1,3,5-trimethylcyclotrisiloxane and having a silanol content of 6.2%, designated diol A, was placed in a bottle with a magnetic stirrer and 7.1 g of methylvinyldiisopropylaminosilane was added. This product was added to the HSDAS at a fast dropwise rate with the rapidly evolved isopropylamine collected with the use of a dry ice trap. At the end of the addition, the resulting product was a low viscosity oil. An additional 79 grams of diol A was added to the flask. The flask was put under aspirator vacuum, and 36 grams of HFDAS was added at a slow dropwise rate, stopping the addition periodically to allow completion of the reaction. In this way, the viscosity of the product began to rise, and rose rapidly as the last few grams of the HFDAS were added. During this vacuum strip portion of the reaction, the 1,3,5-tris(3,3,3-trifluoropropyl1,3,5-trimethylcyclotrisiloxane component of Diol A was removed. The fluorine content of the copolymer was measured at 52.4%.

Rubber Compounding:

156 g of the previously prepared (fluorinated) copolymer was compounded with 54 g of a 200 m$^2$/g fumed silica which had been pretreated with hexamethyldisilazane, 3 grams of diol A, and 12 grams of a copolymer containing 12 m % methylvinlysiloxane and 88% trifluoropropylmethylsiloxane. To this mass was added 3.24 grams of "Varox" powder on a rubber mill. The compound was cured in a 75 mil ASTM rubber mold for 17 minutes at 340° F. and the sheets were post cured for 4 hours at 300° F. The cured sheet were tested and found to have a Shore A hardness of 58, a tensile strength of 600 psi, and an elongation of 194%.

High Fluorine Content Liquid Injection Moldable (LIM) Polymer/Rubber:

75 g of diol A from above was reacted with 0.5 g of dimethylvinylisopropylaminosilane at room temperature. 75 g of HFDAS was placed in a small resin flask and heated in a 130° C. oil bath. To this was added at a fast dropwise rate 75 g of diol A from above which had been pre-reacted with 0.5 grams of vinyldimethylisopropylaminosilane. The evolved isopropylamine was removed with a nitrogen sweep. The flask contents were reacted for 30 additional minutes under vacuum. Then 1.5 more grams of diol A was added at a slow dropwise rate over 10 minutes. 3 grams of water was added to hydrolyze any remaining isopropylamino groups and reacted for 5 minutes followed by vacuum stripping of excess water on an aspirator. The silanols remaining from the hydrolysis were converted to vinyl termination by a reaction of the product oil with 0.5 ml of dimethylvinylisopropylaminosilane followed by a final vacuum stripping on an aspirator.

114 of the above product oil was charged to a small change can mixer along with 34 gram of hexamethyldisilazane treated high surface area silica filler and mixed for 2 hours at 100° C. The batch was cooled to room temperature and 0.035 g of a 3.4% platinum/octanol complex at 3.4% platinum along with 0.05 grams of ethynylcyclohexanol and 3.8 grams of a copolymer oil which is 50 wt % 3,3,3-trifluoropropylmethysiloxane and 50 wt % dimethylsiloxy-silicate resin of with 5500 ppm hydride content. This mixture was cured in at 75 mil ASTM mold for 20 minutes at 177° C., and post cured at 300° F. for 4 hours.

Differing Fluorine Content Copolymers:

500 g aliquots of diol A from example 1 are placed in a 500 ml flask to which was added 0.02 g of 50% NaOH solution and heated to 50° C. under aspirator vacuum to condense silanol groups of diol and produce diols of higher chain length and lower silanol contents. The vacuum is removed at various times to control the amount of condensation that occurs. Using this procedure, diols of lower silanol content that the 6.2% silanol of diol A could be obtained. Chain lengths can be calculated from the silanol content of each separate oil.

Following the general procedure of Example A, in which 1 equivalent of isopropylaminosilane of HFDAS will have a condensation reaction with one equivalent of silanol, i.e. diol A type diol, a series of copolymers of various trifluoropropyl to heptadacafluorodecyl ratios can be produced, and thus total fluorine contents.

TABLE 1

Fluorine Content of Various Copolymer Compositions

| Chain length of diol | Fluorine content of copolymer |
|---|---|
| 5 | 47.0 |
| 7 | 45.0 |
| 9 | 43.6 |
| 12 | 42.2 |
| 15 | 41.3 |

The foregoing examples are merely illustrative of the invention, serving to illustrate only some of the features of the present invention. The appended claims are ended to claim the invention as broadly as it has been conceived and the examples herein presented are illustrative of selected embodiments from a manifold of all possible embodiments. Accordingly it is Applicants' the appended claims are not to be limited by the choice of examples utilized to illustrate features of the present invention. As used in claims, in word "comprises" and its grammatical variants logically also subtend and include phrases of varying and differing extent such as for example, but not limited thereto, "consisting essentially of" and "consisting of." Where necessary, ranges have been supplied, those ranges are inclusive of all subranges there between. It is to be expected that variations in these ranges will suggest themselves to a practitioner having ordinary skill in the art and where not already dedicated to the public, those variations should where possible be construed to be covered by the appended claims. It is also anticipated that advances in science and technology will make equivalents and substitutions possible that are not now contemplated by reason of the imprecision of language and these variations should also be construed where possible to be covered by the appended claims. All United States patents referenced herein are herewith and hereby specifically incorporated by reference.

The invention claimed is:

1. A method for producing a fluorosilicone composition comprising the steps of:
   (a) reacting a perfluoro alpha olefin with a substituted hydrogen di-halo-silane to produce a first reaction product;
   (b) reacting said first reaction product with a primary or secondary amine to produce a second reaction product;
   (c) reacting said second reaction product with a fluorine containing silanol terminated siloxane to produce a fluorosilicone composition said fluorosilicone composition comprising M, D and D' units having the formula:

$$M_a D_b D'_c$$

with:

$$M = R^1 R^2 R^3 SiO_{1/2},$$

where $R^1$ and $R^2$ are each independently selected from the group of C1 to C40 monovalent hydrocarbon radicals and $R^3$ is selected from the group consisting of C1 to C40 monovalent hydrocarbon radicals, C2 to C40 monovalent alkenyl hydrocarbon radicals, hydrogen, hydroxyl, C3 to C16 fluorine substituted monovalent hydrocarbon radicals and $R^{11}R^{12}N$ where $R^{11}$ is selected from the group C1 to C10 monovalent hydrocarbon radicals and R12 is selected from the group C1 to C10 monovalent hydrocarbon radicals and hydrogen;

$$D = R^4 R^5 SiO_{2/2},$$

where $R^4$ is selected from the group consisting of C1 to C40 monovalent hydrocarbon radicals, C2 to C40 monovalent alkenyl hydrocarbon radicals and C3 to C7 fluorine substituted monovalent hydrocarbon radicals and $R^5$ is selected from the group of C3 to C7 fluorine substituted monovalent hydrocarbon radicals; and $$D' = R^6 R^7 SiO_{2/2},$$

where $R^6$ is selected from the group consisting of C1 to C40 monovalent hydrocarbon radicals and C6 to C16 fluorine substituted monovalent hydrocarbon radicals and $R^7$ is selected from the group of C6 to C16 fluorine substituted monovalent hydrocarbon radicals, where the subscripts a, b and c are non-zero and positive, a is at least 2 and c is at least 2.

2. The method of claim 1 wherein said fluorosilicone has a weight percent fluorine content in excess of about 37.5 weight percent.

3. The method of claim 1 wherein said fluorosilicone has a weight percent fluorine content in excess of about 45.0 weight percent.

4. The method of claim 1 wherein said fluorosilicone has a weight percent fluorine content in excess of about 50.0 weight percent.

5. The method of claim 1 where $R^4$ is methyl.

6. The method of claim 1 where $R^5$ is trifluoropropyl.

7. The method of claim 1 where $R^6$ is methyl.

8. The method of claim 1 where $R^7$ is $(C_n F_{2n+1})CH_2CH_2)$ with n ranging from 4 to 14.

9. The method of claim 8 where n is 8.

10. The method of claim 9 where $R^4$ is methyl.

11. The method of claim 10 where $R^5$ is trifluoropropyl.

12. The method of claim 11 where $R^6$ is methyl.

13. The method of claim 12 wherein said fluorosilicone has a weight percent fluorine content in excess of about 37.5 weight percent.

14. The method of claim 12 wherein said fluorosilicone has a weight percent fluorine content in excess of about 45.0 weight percent.

15. The method of claim 12 wherein said fluorosilicone has a weight percent fluorine content in excess of about 50.0 weight percent.

* * * * *